United States Patent [19]

Kihara

[11] Patent Number: 5,493,558
[45] Date of Patent: Feb. 20, 1996

[54] DISC-SHAPED RECORDING MEDIUM WITH MAGNETIC DATA AND READ OUT REGION

[75] Inventor: Nobuyuki Kihara, Tokyo, Japan

[73] Assignee: Sony Corporation, Japan

[21] Appl. No.: 957,236

[22] Filed: Oct. 6, 1992

[30] Foreign Application Priority Data

Oct. 8, 1991 [JP] Japan .................................. 3-289279

[51] Int. Cl.⁶ .................................................. G11B 7/24
[52] U.S. Cl. .................... 369/275.2; 369/275.3; 369/59
[58] Field of Search .............. 369/275.2, 275.1, 369/275.3, 275.4, 13, 14, 32, 44.26, 44.29, 44.33, 48, 277, 278, 279, 284, 283, 53, 54, 58, 59, 124; 360/114, 59

[56] References Cited

U.S. PATENT DOCUMENTS

| | | | |
|---|---|---|---|
| 4,942,565 | 7/1990 | Lagadec | 369/59 |
| 4,985,881 | 1/1991 | Saito et al. | 369/13 |
| 5,153,861 | 10/1992 | Maeda et al. | 369/32 |
| 5,214,631 | 5/1993 | Maeda et al. | 369/59 |
| 5,243,588 | 9/1993 | Maeda et al. | 369/54 |
| 5,244,705 | 9/1993 | Tsurushima et al. | 428/64 |

FOREIGN PATENT DOCUMENTS

| | | |
|---|---|---|
| 0346979A2 | 12/1989 | European Pat. Off. . |
| 0377340A2 | 7/1990 | European Pat. Off. . |
| 0382154A3 | 8/1990 | European Pat. Off. . |
| 0397238A1 | 11/1990 | European Pat. Off. . |
| 0441967A1 | 8/1991 | European Pat. Off. . |
| 2636763 | 3/1990 | France . |

*Primary Examiner*—Ali Neyzari
*Attorney, Agent, or Firm*—Limbach & Limbach

[57] ABSTRACT

A disc-shaped recording medium capable of being rewritten comprises: a lead-in area which is provided in the inner rim of the disc shaped recording medium and in which information concerning the disc-shaped recording medium is prerecorded; a data area which is provided in the outer periphery of lead-in area and which is capable of recording data; and a lead-out area which is provided in the outer periphery of the data area and which indicates the end of the data area, the lead-out area being a recordable area the same as data area.

7 Claims, 3 Drawing Sheets

DISC-SHAPED RECORDING MEDIUM WITH MAGNETIC DATA AND READ OUT REGION

BACKGROUND OF THE INVENTION

1. Field of the Invention

The invention relates to a disc-shaped recording medium to record or reproduce, for instance, digital audio signals.

2. Description of the Prior Art

What is called a compact disc (CD) which audio signals have been converted into digital signals and recorded onto an optical disc is widespread. FIG. 1 shows a construction of an optical disc 101 which is used as a conventional compact disc. In the conventional compact disc, for instance, an outer diameter is set to 12 cm and, as shown in FIG. 1, a lead-in area 102 is provided in the innermost rim and a lead-out area 103 is provided in the outermost rim. A region between the lead-in area 102 and the lead-out area 103 is used as a data area 104. A TOC (Table Of Contents) to record recording position information of data is provided in the lead-in area 102. A predetermined pattern is recorded in the lead-out area 103. Music data or the like is recorded in the data area 104. The music data is what is called straight PCM audio data which is obtained by simply linearly quantizing analog audio signals. In such a conventional compact disc, data is recorded as pits in all of the lead-in area 102, lead-out area 103, and data area 104.

In a disc reproducing apparatus for reproducing such a conventional compact disc, when a disc is loaded, the lead-in area 102 is first accessed and the information of the TOC in the lead-in area 102 is read. A desired data position is accessed by using the information of the TOC and the recording data is reproduced. When a pickup reaches the lead-out area 103 of the outermost rim, a desired pattern which is recorded into the lead-out area 103 is reproduced. Due to this, it is detected that the pickup has reached the outermost rim of the optical disc 101.

The above conventional compact disc is of the read only type and data cannot be recorded. Therefore, a rerecordable write once type CD-WO or a recordable and reproducible CD-MO using a magneto-optic disc has been proposed. In a magneto-optic disc 201 as a recordable and reproducible CD-MO, as shown in FIG. 2, a portion between a lead-in area 202 and a lead-out area 203 is used as a data area 204. TOC data is recorded into the lead-in area 202 by pits. A predetermined pattern is recorded into the lead-out area 203 by pits. Desired data can be recorded or reproduced into/from the data area 204 by marks in the magnetizing direction of a perpendicular magnetization film.

In such a CD-MO, the lead-in area 202 and lead-out area 203 are set to the areas (hereinafter, referred to as premastered areas) in which data is recorded by pits. The data area 204 is set to the area (hereinafter, referred to as a magnetooptic area) in which data is recorded by marks in the magnetizing direction of the perpendicular magnetization film. Therefore, it is necessary to switch the reproduction signals from the pickup. Namely, the reproduction signal of the premastered area is obtained from the level of the reflected light from the disc. The reproduction signal of the magneto-optic area is obtained by detecting the direction of a Kerr rotational angle. That is, the reproduction signal of the premastered area is derived from the sum signal of the signals from two photodetectors of the pickup. The reproduction signal of the magneto-optic area is obtained from the differential signal of the signals from the two photodetectors of the pickup. Therefore, in the lead-in area 202 and lead-out area 203 comprising the premastered areas, the sum signal of the signals from the two photodetectors of the pickup needs to be generated. In the data area 204 comprising the magneto-optic area, the differential signal of the signals from the two photodetectors of the pickup needs to be generated.

FIG. 3 shows an example of a switching circuit of the reproduction signals. In FIG. 3, outputs RF1 and RF2 of the two photodetectors of the pickup are respectively supplied to input terminals 251 and 252. The reproduction signals RF1 and RF2 from the input terminals 251 and 252 are supplied to an adding circuit 253 and are also supplied to a subtracting circuit 256. The outputs RF1 and RF2 of the two photodetectors are added by the adding circuit 253. The subtraction between the outputs RF1 and RF2 of the two photodetectors is executed by the subtracting circuit 256. An output SRF of the adding circuit 253 is supplied to a terminal 254A of a switching circuit 254. An output SMO of the subtracting circuit 256 is supplied to a terminal 254B of the switching circuit 254. An output of the switching circuit 254 is generated from an output terminal 255.

When the premastered areas are being reproduced, the phases of the outputs RF1 and RF2 of the two photodetectors are equal. When the outputs RF1 and RF2 of the two photodetectors are added by the adding circuit 253, the reproduction signal of the physical pits is obtained. The output which is obtained by executing the subtraction between the outputs RF1 and RF2 of the two photodetectors by the subtracting circuit 256 discard.

When the magneto-optic area is reproduced, the phases of the outputs RF1 and RF2 of the two photodetectors are opposite. By performing the subtraction between the outputs RF1 and RF2 of the two photodetectors by the subtracting circuit 256, the reproduction signal of the marks in the magnetizing direction of the perpendicular magnetization film is derived. The output which is obtained by adding the outputs RF1 and RF2 of the two photodetectors by the adding circuit 255 is discard.

In FIG. 3, when the lead-in area 202 and the lead-out area 203 as premastered areas are reproduced, the switching circuit 254 is set to the terminal 254A side. Due to this, the data of the lead-in area 202 and the data of the lead-out area 203 are reproduced from the sum signal of the outputs RF1 and RF2 of the two photodetectors. When the data area 204 as a magneto-optic area is reproduced, the switching circuit 254 is set to the terminal 254B side. Consequently, the data recorded in the data area is reproduced.

As mentioned above, in the conventional CD-MO disc the lead-out area 203 is set to the premastered area. However, when the lead-out area 203 is formed by pits, a state in which the pickup has reached the outermost rim of the disc cannot be detected even when the pickup has been moved from the magneto-optical area to the lead-out area 203 and there is a danger such that the servo runs away because the recording data is not correctly reproduced.

That is, when the data area is reproduced, the switch 254 in FIG. 3 is connected to the terminal 254B side and a difference signal between the outputs RF1 and RF2 of the two photodetectors is generated. Assuming that the lead-out area 203 has been formed by pits, when the pickup reaches the lead-out area 203 of the outermost rim, unless the switching circuit 254 is switched to the terminal 254A side, the data in the lead-out area 203 cannot be reproduced. Therefore, unless the switching circuit 254 is correctly switched, even when the pickup reaches the lead-out area 203 of the outermost rim, a predetermined pattern of the lead-out area 203 cannot be reproduced and there is a possibility such that the pickup is deviated out of the position of the disc.

OBJECTS AND SUMMARY OF THE INVENTION

It is, therefore, an object of the invention to provide a disc-shaped recording medium in which a lead-out area can be certainly detected and a runaway of a servo can be avoided.

According to an aspect of the invention, there is provided a disc-shaped recording medium capable of being rewritten comprising:

a lead-in area which is provided in the inner rim of the disc shaped recording medium and in which information concerning the disc-shaped recording medium is prerecorded;

a data area which is provided in the outer periphery of the lead-in area and which is capable of recording data; and a lead-out area which is provided in the outer periphery of the data area and which indicates the end of the data area, the lead-out area being a recordable area the same as data area.

In the invention, by using the lead-out area as a magneto-optic area, when a pickup is moved from a data area to the lead-out area, a recording pattern of the lead-out area can be detected without switching a reproduction signal. Therefore, the lead-out area can be certainly detected and the runaway of the servo can be prevented.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

An embodiment of the invention will be described hereinbelow with reference to the drawings. The invention is applied to an optical disc to record and reproduce music information which has been data compressed. As such a recordable optical disc, a disc disclosed in, for example, Japanese Patent Application Nos. Hei 2-169977, (corresponding to U.S. Pat. No. 5,214,631), Hei 2-222821, and Hei 2-222823 filed by the same applicant as the present invention is suitable. In the disc, a magneto-optic disc or the like is used as a recording medium and digital audio data which has been bit compression encoded is recorded and reproduced.

In such an optical disc, for instance, data of what is called a standard CD format or what is called straight PCM audio data obtained by simply linearly quantizing analog audio is bit compressed into, e.g., about ¼ and recorded. Therefore, in a smaller disc, substantially the same recording/reproducing time as that of the standard compact disc of 12 cm is obtained and the apparatus can be miniaturized. By setting a (momentary) bit rate for recording/reproducing to the same value as that of the standard CD-DA format, the times which are required to actually onto the disc and to actually read out from the disc are respectively reduced to about ¼, so that the remaining time of about ¾ can be assigned to processes such as a retry or the like. Consequently, even under bad condition such that the mechanism section is vibrated by, for example, a disturbance and a focusing or tracking servo or the like is made ineffective, the recording or reproduction can be more certainly executed. The invention can be applied to a portable small apparatus.

Figure 1:
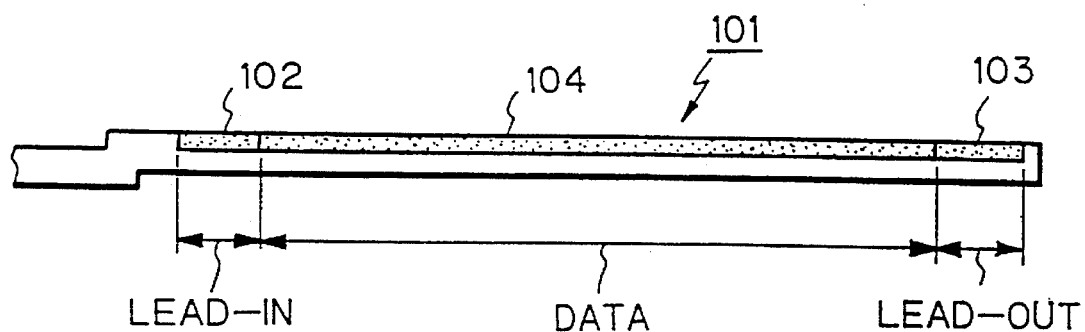
FIG. 1 is a cross sectional view of an example of a conventional optical disc.
Figure 2:
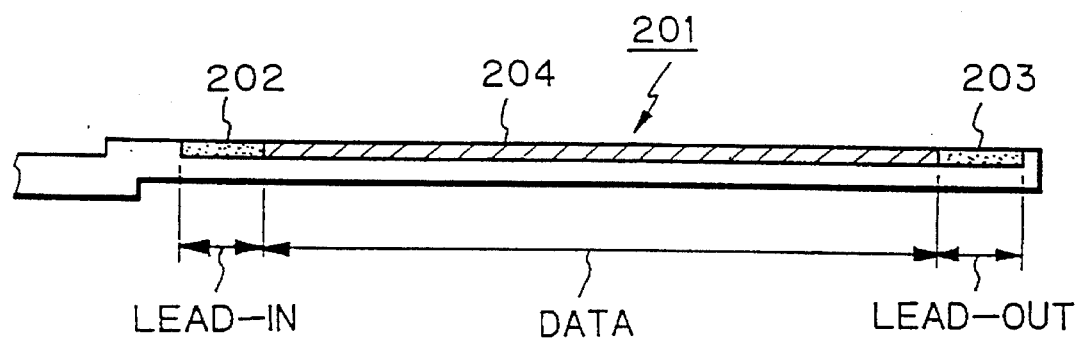
FIG. 2 is a cross sectional view of another example of a conventional optical disc.
Figure 3:
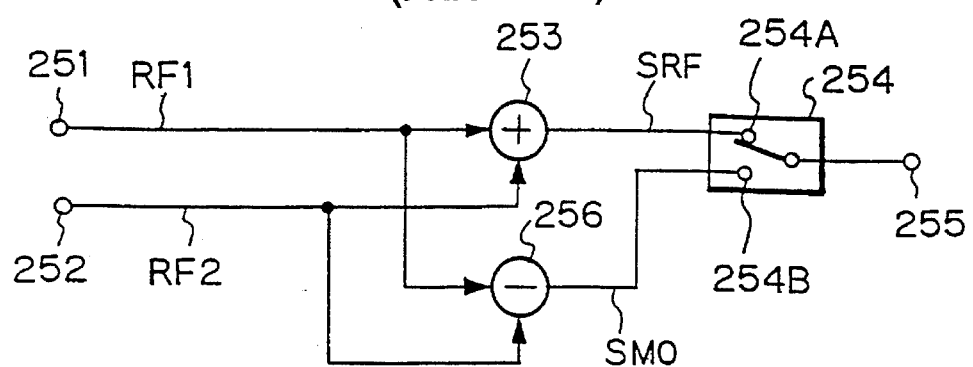
FIG. 3 is a block diagram which is used to explain a reproducing system using the conventional optical disc.
Figure 4:
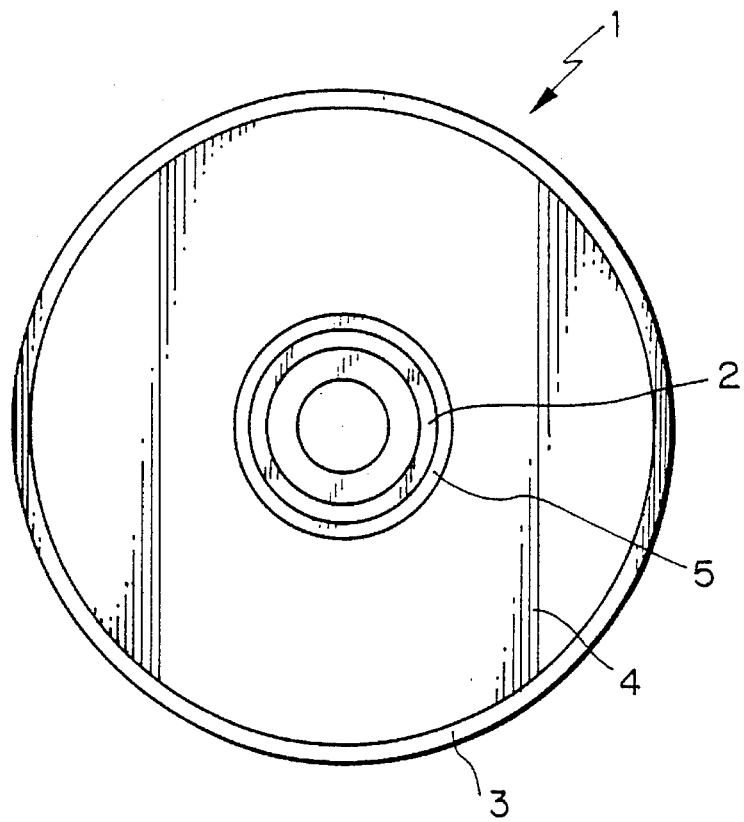
FIG. 4 is a plan view of an embodiment of the invention.
Figure 5:
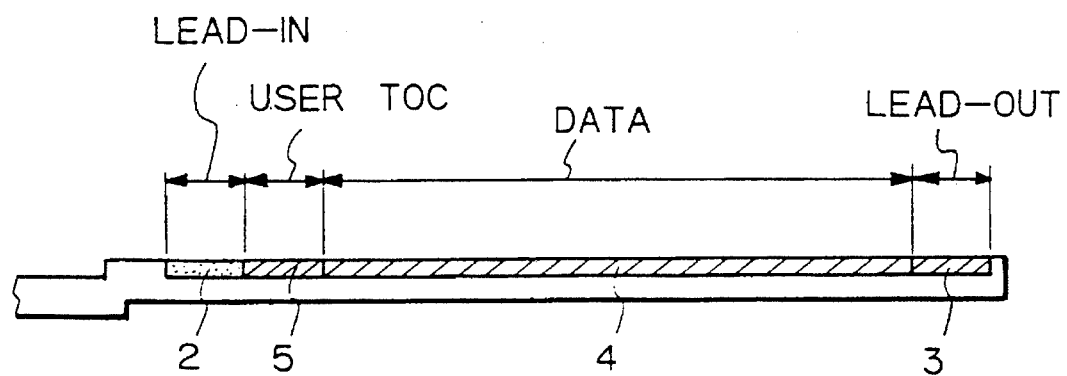
FIG. 5 is a cross sectional view of an embodiment of the invention.

FIGS. 4 and 5 show an embodiment of a disc to which the invention is applied. In FIGS. 4 and 5, a magneto-optic disc 1 to which the invention is applied has an outer diameter of, for instance, 64 mm. A lead-in area 2 is provided in the innermost rim of the magneto-optic disc 1. A TOC in which information concerning disc (kind of discs, position of the data area, position of the lead-out area or the like) is provided in the lead-in area 2. The lead-in area is used as a premastered area. A lead-out area 3 is provided in the outermost rim of the magneto-optic disc 1. The lead-out area 3 is provided with a magneto-optic area and a predetermined pattern is magneto-optically recorded by marks in the magnetizing direction of a perpendicular magnetization film.

A user TOC area 5 indicative of the position information of data which has been recorded into a data area 4 is provided in the outer periphery of the lead-in area 2. The portion between the user TOC area 5 and the lead-out area 3 is used as a data area 4. The user TOC area 5 and the data area 4 are both magneto-optic areas. A groove is provided in the magneto-optic area along a track. A tracking control is performed by using the groove and address information recorded as a wobble component in the groove. Techniques to record the address information and the like by using the wobbling component of the groove as mentioned above have already been proposed by the same applicant as the present invention in, for instance, U.S. Pat. No. 4,942,565.

Digital audio data of a plurality of pieces of music which has been bit compressed is recorded in the data area 4 of the magneto-optic disc 1. The address information of each music (data file) are recorded in, for example, the user TOC area 5.

Figure 6:
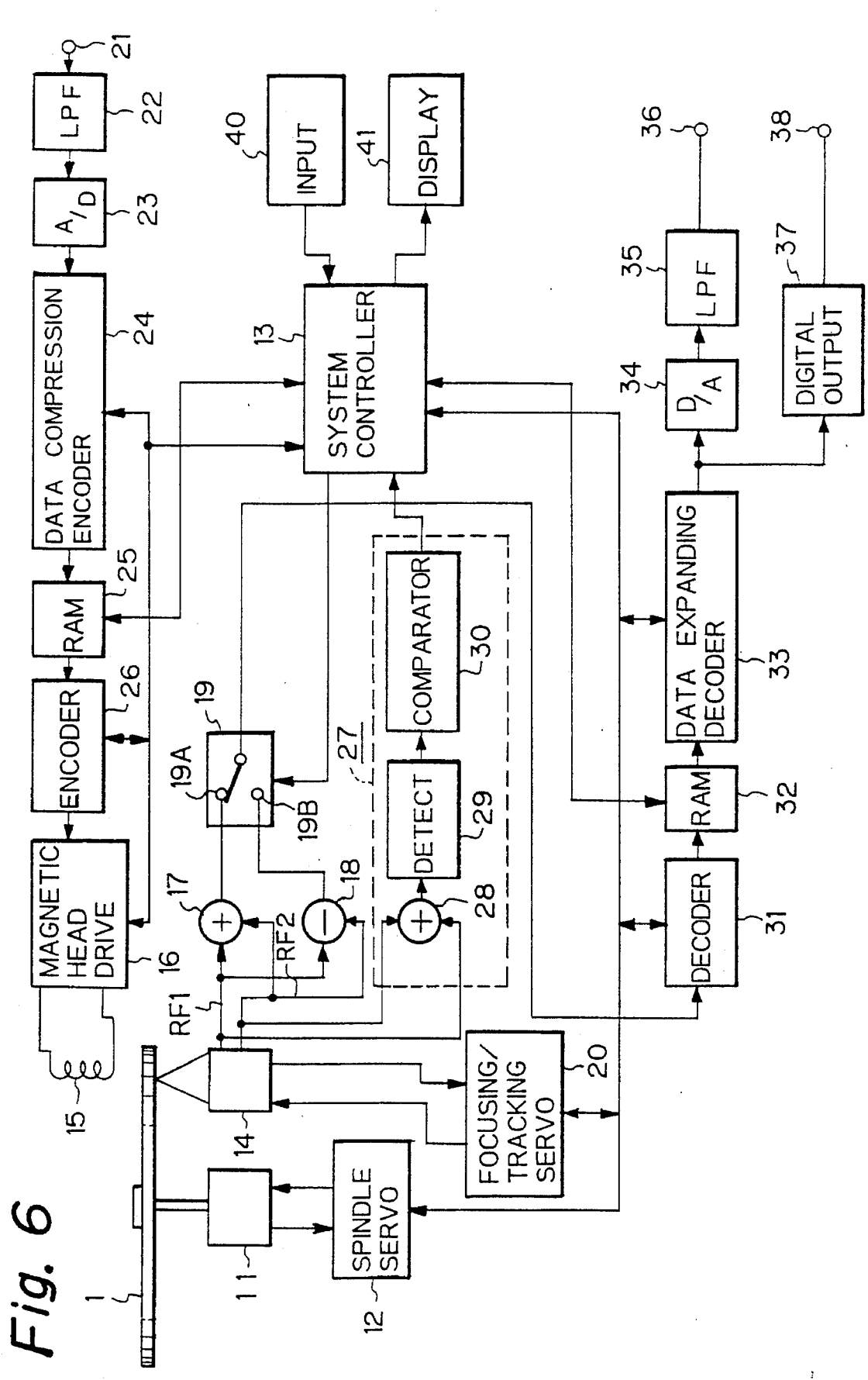
FIG. 6 is a block diagram of an example of a recording and reproducing apparatus of a magneto-optic disc to which the invention is applied.

FIG. 6 is a block diagram showing a schematic construction of a recording/reproducing apparatus to record/reproduce data onto/from the magneto-optic disc.

In FIG. 6, as mentioned above, the digital audio data of a plurality of pieces of music (a plurality of data files) which has been bit compressed is recorded on the magneto-optic disc 1. The magneto-optic disc 1 is rotated by a spindle motor 11. The rotation of the spindle motor 11 is controlled under the management of a system controller 13 by a spindle servo circuit 12.

An optical pickup 14 and a magnetic head 15 to record and/or reproduce are provided for the magneto-optic disc 1. For instance, the optical pickup 14 is constructed by: a laser light source such as a laser diode or the like; optical parts such as collimating lens, objective lens, polarizing beam splitter, cylindrical lens, and the like; a photodetector having a light receiving portion of a predetermined pattern; and the like. The optical pickup 14 is arranged at the position which faces the magnetic head 15 through the magnetic disc 1.

When data is recorded onto the magneto-optic disc 1, the magnetic head 15 is driven by a head driving circuit 16 of the recording system and a modulated magnetic field according to the recording data is applied. A laser beam is also irradiated to a target track of the magneto-optic disc 1 by the optical pickup 14. Thus, the magnetizing direction of the perpendicular magnetization film is determined in accordance with the direction of the magnetic field applied from the outside and the data is magneto-optically recorded. In the reproducing mode, the laser beam is irradiated from the optical pickup 14 and the data is reproduced from the reflected light. In the premastered area (portions in which the data has been recorded by physical pits and it corresponds to the lead-in area 2), the data is reproduced from the sum signal of the signals of two detectors of the optical pickup 14. In the magneto-optic area (portion in which the data has been recorded by the magnetizing direction of the perpendicular magnetization film and it corresponds to the lead-out area 3, data area 4, and user TOC area 5), the data is reproduced from the difference signal of the signals of the two detectors of the optical pickup 14.

The outputs RF1 and RF2 of the two photodetectors from the optical pickup 14 are supplied to an adding circuit 17 and a subtracting circuit 18. The outputs RF1 and RF2 of the two photodetectors are added by the adding circuit 17. An output of the adding circuit 17 is supplied to a terminal 19A of a switching circuit 19. The premastered area is reproduced and the subtraction between the outputs RF1 and RF2 of the two photodetectors is executed by the subtracting circuit 18. An output of the subtracting circuit 18 is supplied to a terminal 19B of the switching circuit 19. In the case where the magneto-optic area is reproduced and the signal of the outputs RF1 and RF2 of the two photodetectors is generated, the switching circuit 19 is switched to the terminal 19A side. In the case where the difference signal of the outputs RF1 and RF2 of the two photodetectors is generated, the switching circuit 19 is switched to the terminal 19B side.

A focusing and tracking servo circuit 20 to execute a focusing and tracking control of the optical pickup 14 is provided. The focusing and tracking servo circuit 20 is controlled by the system controller 13.

In the data recording mode, analog audio signals from an input terminal 21 are supplied to an A/D converter 23 through a low pass filter 22. The input analog audio signals are converted into the digital signals by the A/D converter 23. The digital audio signals are supplied to a data compressing encoder 24.

The data compressing encoder 24 executes a highly efficient encoding process such as an AD (adaptive deferential) PCM or the like to the digital audio signals which are obtained from the A/D converter 23. The digital audio signals which are supplied to the data compressing encoder 23 are what is called straight PCM data. Practically speaking, it is the PCM data in which a sampling frequency is equal to 44.1 kHz and the number of quantization bits is equal to 16 bits in a manner similar to the standard CD (compact disc) format. The input audio PCM data may be subjected to the highly efficient encoding process such as to obtain a bit rate within a range from ½ to ⅟16 in accordance with a combination of, for instance, the sampling frequency, bit compressing algorithm, and stereophonic/monaural as mentioned above by the data compressing encoder 24.

The output of the data compressing encoder 24 is supplied to a memory 25. In the memory 25, the writing and reading operations of the data are controlled by the system controller 13. The memory 25 is used as a buffer memory to temporarily store the bit compressed data which is supplied from the encoder 13 and to record onto the disc as necessary. That is, in the data compressing mode of a compressed ratio of, for instance, 4, the compressed data of a predetermined bit rate which has been reduced to about ¼ of the data transfer speed (bit rate) of the standard CD format is continuously written into the memory 25.

When the compressed data is recorded onto the magneto-optic disc 1, the data is read out from the memory 25 in a burst or discrete manner at the same data transfer speed as the standard CD-DA format under the same disc rotational speed (constant linear velocity) as those of the standard CD-DA format and recorded. That is, the time at which the signals are actually recorded in the recording mode is equal to about ¼ of the whole time and the remaining time of ¾ corresponds to the rest period of time in which the recording is not executed. On the magneto-optic disc 1, the next recording is performed subsequent to the area which has been recorded just before the rest period of time, thereby enabling the continuous recording to be performed on the medium surface. Consequently, the recording of the same recording density and recording pattern as those of the standard CD-DA format is executed.

The compressed data read out from the memory 25 in a burst manner at a bit rate according to the data transfer speed of the standard CD-DA format is supplied to an encoder 26 to execute an interleaving process, an error correction encoding process, an EFM modulating process, and the like. An output of the encoder 26 is supplied to the magnetic head driving circuit 16. A modulated magnetic field is generated from the magnetic head 15 by an output of the magnetic head driving circuit 16. The modulated magnetic field is applied to the magneto-optic disc 1. The laser beam is irradiated from the optical pickup 14 and the data is recorded into the data area 4 of the magneto-optic disc 1.

As mentioned above, when the data has been recorded into the data area 4, the address information of the recording data is recorded into the user TOC area 5. The start address and end address are used as address information which is recorded into the user TOC. The compression ratio information of the recording data can be also recorded in the user TOC.

The reproducing system of the disc recording and reproducing apparatus will now be described. The reproducing system is provided to reproduce the recording data which has continuously been recorded on the recording track of the magneto-optic disc 1 by the above recording system. By tracing the recording track on the magneto-optic disc 1 by the laser beam by the optical pickup 14, the recording signal is read from the magneto-optic disc 1.

As mentioned above, in the premastered area, the data is reproduced from the sum signal (RF1+RF2) of the two photodetectors of the optical pickup 14. In the magneto-optic area, the data is reproduced from the difference signal (RF1−RF2) of the two photodetectors of the optical pickup 14. The data recording/reproducing apparatus has a judging circuit 27 to discriminate whether the area which is at present being traced is the premastered area or the magneto-optic area.

The judging circuit 27 is constructed by an adding circuit 28, a detecting circuit 29, and a comparator 30. The sum signal of the two photodetectors of the optical pickup 14 is formed by the adding circuit 28. The level of the sum signal is detected by the detecting circuit 29. An output of the detecting circuit 29 is supplied to the comparator 30. When the area which is at present being traced is the premastered area, the reproduction signal is obtained from the sum signal of the photodetectors of the optical pickup 14, so that an output of a predetermined level or higher is detected from the detecting circuit 29. When the area which is at present being traced is the magneto-optic area, the sum signal of the two photodetectors of the optical pickup 14 is equal to or less than the predetermined level. Therefore, from an output of the comparator 30, it is possible to judge whether the area which is at present being traced is the premastered area or the magneto-optic area. A judgment output is supplied to the system controller 13. On the basis of the judgment output, a switch control signal is formed and supplied to the switching circuit 19.

Which portion on the magneto-optic disc 1 is the premastered area or the magneto-optic area can be previously known from the lead-in information. Therefore, the premastered area and the magneto-optic area can be judged from the address. However, the area cannot be certainly judged from only the address. By providing such a judging circuit 27, the premastered area and the magneto-optic area can be certainly discriminated.

The output of the switching circuit 19 is supplied to a decoder 31. The decoder 31 corresponds to the encoder 26 in the above recording system and executes processes such as deinterleaving process, decoding process for an error correcting process, EFM demodulating process, and the like. The compressed data which is generated from the decoder 31 is supplied to a memory 32.

The writing and reading operations of data into/from the memory 32 are controlled by the system controller 13. The reproduction data which has been reproduced in a burst manner at the same data transfer speed as that of the standard CD-DA format from the magneto-optic disc 1 is decoded and is written. The reproduction data written into the memory 32 in a burst manner is continuously read out at a predetermined bit rate corresponding to the compression ratio (in this example, at a bit rate of ¼).

The compressed data which is continuously read out from the memory 22 is supplied to a data expanding decoder 33. The data expanding decoder 33 corresponding to the encoder 24 of the recording system expands the compressed data and reproduces the digital audio data of 16 bits. The digital audio data from the decoder 33 is supplied to a D/A converter 34. The digital audio data is converted into the analog signals by the D/A converter 34. The analog audio signal is generated from an output terminal 36 through a low pass filter 35. An output from the decoder 33 is generated from a digital audio output terminal 38 through a digital output circuit 37.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

As mentioned above, in the magneto-optic disc 1 to which the invention is applied, the lead-out area 3 is used as a magneto-optic area the same as the data area 4. Therefore, when the optical pickup 14 reaches the lead-out area 3 from the data area 4, the recording pattern of the lead-out area 4 can be detected without switching the reproduction signal. Thus, the switching control of the reproduction signal is simplified, the lead-out area 3 can be certainly detected, and it is possible to prevent the optical pickup 14 from deviating out of the position of the disc.

Further, according to the invention, since the lead-out area 3 is set to a magneto-optic area, the manufacturing of the disc can be simplified and the data can be also recorded into the lead-out area 4.

What is claimed is:

1. A disc-shaped recording medium capable of being rewritten comprising:

a lead-in area which is provided in the inner rim of said disc-shaped recording medium and in which read-only information concerning said disc-shaped recording medium is prerecorded along with read-only address information;

a data area which is provided in the outer periphery of said lead-in area and which is capable of recording data; and a lead-out area which is provided in the outer periphery of said data area and which indicates the end of said data area, said lead-out area also being a recordable area, and having recorded therein a detectible, predetermined pattern;

wherein said data area and said lead-out area have concentric or spiral recording tracks with guide grooves and address information is prerecorded in said data area and said lead-out area by displacing said guide grooves in the radial direction of said disc-shaped recording medium as a wobble component in said guide grooves.

2. A disc-shaped recording medium according to claim 1, wherein address information indicative of the position of said data area and the position of said lead-out area is formed in said lead-in area by a pattern of pits.

3. A disc-shaped recording medium according to claim 1, wherein information is recorded in said lead-in area by a pattern of pits.

4. A disc-shaped recording medium according to claim 1, wherein said data area and said lead-out area have a perpendicular magnetization layer.

5. A disc-shaped magneto-optic recording medium capable of being rewritten comprising:

a read only lead-in area which is provided in the inner rim of said disc-shaped recording medium and in which information concerning said disc-shaped recording medium is prerecorded along with read-only address information;

a magneto-optic data area which is provided in the outer periphery of said lead-in area and which is capable of recording data; and a magneto-optic lead-out area which is provided radially outward of the dam area and which indicates the end of the data area, the lead-out area having a predetermined pattern of magneto-optically recorded marks in a magnetizing direction of a perpendicular magnetization film on the disc-shaped recording medium in the lead-out area;

wherein said data area and said lead-out area have concentric or spiral recording tracks with guide grooves and address information is prerecorded in said data area and said lead-out area by displacing said guide grooves in the radial direction of said disc-shaped recording medium as a wobble component in said guide grooves.

6. In combination, a magneto-optic disc and a magneto-optic disc reproducing apparatus comprising:

a disc-shaped recording medium capable of being rewritten comprising, a premastered area wherein data is recorded by physical pits corresponding to a lead-in area, and a magneto-optically recordable data area;

a magneto-optically recordable lead-out area, radially outward of the data area, and in which is recorded a predetermined pattern, demarking the end of the data area, by marks in a magnetizing direction of a perpendicular magnetization film on said disc-shaped recording medium;

a magnetic head for recording and reproducing information onto and from said disc-shaped recording medium;

an optical pickup for recording and reproducing information onto and from said disc-shaped recording medium;

a discriminating means for determining whether the optical pickup is tracing said premastered area or said magneto-optic area, said discriminating means comprising an adding circuit, a detecting circuit, and a comparator.

7. The combination of a magneto-optic disc and a magneto-optic disc reproducing apparatus according to claim 6, wherein the optical pickup includes a pair of photo-detectors having outputs which are added by the adding circuit to produce a sum output signal, the detecting circuit receives the sum output signal and detects a level thereof, and a comparator compares the level detected by the detecting circuit with a predetermined level to determine if the optical pickup is positioned over the lead-out area.

* * * * *